United States Patent Office 3,281,507
Patented Oct. 25, 1966

3,281,507
PROCESS FOR MAKING DIALKOXY PHOSPHINYL CARBAMOYL DISULFIDES
Glenn R. Price, South Chicago Heights, and Edward N. Walsh, Chicago Heights, Ill., assignors to Stauffer Chemical Company, New York, N.Y., a corporation of Delaware
No Drawing. Filed June 17, 1963, Ser. No. 288,483
1 Claim. (Cl. 260—968)

This invention relates to a new class of phosphorus-containing pesticides and methods for preparing and utilizing the same. In particular, this invention relates to a new class of compounds which may be represented by the general formula:

$$\begin{array}{c} RO \\ \diagdown \\ R^1O \end{array} \!\! \begin{array}{c} O \\ \| \\ P-S-S-C-N \end{array} \!\! \begin{array}{c} O \\ \| \\ R^3 \end{array} \!\! \begin{array}{c} R^2 \\ \diagup \\ R^3 \end{array}$$

in which R and $R^1$ are lower alkyl, $R^2$ is selected from the group consisting of allyl and methallyl, and $R^3$ is selected from the group consisting of hydrogen, allyl, and methallyl. Suitable lower alkyl radicals for R and $R^1$ are, e.g., methyl, ethyl, isobutyl, amyl, octyl, and the like.

This application is a continuation-in-part of prior copending U.S. patent application Serial No. 101,675, filed April 10, 1961, now Patent No. 3,094,548.

The compounds of the invention may be prepared by either of two methods. The first of these methods may be illustrated by the following general equation:

$$\begin{array}{c} RO \\ \diagdown \\ R^1O \end{array} \!\! \begin{array}{c} O \\ \| \\ P-SCl \end{array} + \begin{array}{c} S \\ \| \\ R^4O-C-N \end{array} \!\! \begin{array}{c} R^2 \\ \diagup \\ R^3 \end{array} \longrightarrow$$

$$\begin{array}{c} RO \\ \diagdown \\ R^1O \end{array} \!\! \begin{array}{c} O \\ \| \\ P-S-S-C-N \end{array} \!\! \begin{array}{c} O \\ \| \\ R^3 \end{array} \!\! \begin{array}{c} R^2 \\ \diagup \\ R^3 \end{array} + R^4Cl$$

where R, $R^1$, $R^2$, and $R^3$ are as defined above and $R^4$ is an alkyl radical. Reaction may be carried out in the presence of an inert organic solvent such as benzene, ethyl ether, and the like. The reaction proceeds vigorously at all temperatures between about 0° C. and 70° C., but a preferred temperature range is from 0° C. to about room temperature. The alternative process for preparing the compounds may be illustrated by the following general equation:

$$\begin{array}{c} RO \\ \diagdown \\ R^1O \end{array} \!\! \begin{array}{c} O \\ \| \\ P-SCl \end{array} + \begin{array}{c} O \\ \| \\ MS-C-N \end{array} \!\! \begin{array}{c} R^2 \\ \diagup \\ R^3 \end{array} \longrightarrow$$

$$\begin{array}{c} RO \\ \diagdown \\ R^1O \end{array} \!\! \begin{array}{c} O \\ \| \\ P-S-S-C-N \end{array} \!\! \begin{array}{c} O \\ \| \\ R^3 \end{array} \!\! \begin{array}{c} R^2 \\ \diagup \\ R^3 \end{array} + MCl$$

where R, $R^1$, $R^2$, and $R^3$ are as defined supra, and M is an alkali metal such as sodium or potassium. Further, an organic salt such as $$(C_3H_5)_2NH \cdot (C_3H_5)_2N\overset{O}{\overset{\|}{C}}-SH$$

may be used as a reactant in place of the alkali metal dialkyl-thiocarbamate shown in the last equation. As in the first reaction scheme, an inert organic solvent may be used to disperse the reactants; the reaction proceeds vigorously at temperatures as low as 0° C. and as high as 70° C. Due to salt formation, however, it is best to stir the final reaction mixture for a short period of time after the reactants are mixed in order to insure complete reaction. The salt may then be removed by filtration, washing, or other well-known means. The following specific examples will further illustrate the process of preparing the compounds of the invention.

EXAMPLE 1

To a suspension of 19.5 grams of potassium diallylthiocarbamate in 150 cc. of benzene was added 20.5 grams of diethylphosphorosulfenyl chloride at 10° C. over a thirty minute period. The reaction mixture was stirred one additional hour at room temperature and was then cooled to 10° C. and washed with two 50 cc. portions of distilled water. The organic layer was then separated from the reaction mixture and concentrated to 50° C. at a pressure of 1.0 mm. of Hg to yield 29.0 grams (89.5% of theoretical) of $(C_2H_5O)_2P(O)SSC(O)N(C_3H_5)_2$, having an index of refraction $N_D{}^{25}=1.5111$.

EXAMPLE 2

To a suspension of 22.3 grams of potassium dimethallylthiocarbamate in 150 cc. of benzene was added 20.5 grams of diethylphosphorosulfenyl chloride at 10° C. over a thirty minute period. The reaction mixture was stirred for an additional hour at room temperature, cooled to 10° C. and washed with two 50 cc. portions of distilled water. The benzene was removed under partial pressure and the product concentrated to 50° C. at a pressure of 1.0 mm. of Hg to yield 30.7 grams (87.0% of theoretical) of $(C_2H_5O)_2P(O)SSC(O)N(C_4H_7)_2$.

EXAMPLE 3

To a solution of 14.5 grams of N-(allyl)-O-(ethyl) thiocarbamate in 200 cc. of ether was added 17.7 grams of dimethylphosphorosulfenyl chloride over a thirty minute period at 20° C. The reaction mixture was stirred for one additional hour at room temperature, the ether evaporated and the product concentrated to 1.0 mm. Hg at 50° C. The product weighing 25.0 grams (97% of theoretical), analyzing as 12.1% P and 23.2% S, as compared to 12.1% P and 24.8% S theoretical, was identified as $(CH_3O)_2P(O)SSC(O)NHC_3H_5$.

EXAMPLE 4

To a solution of 14.5 grams of N-(allyl)-O-(ethyl) thiocarbamate in 200 cc. of dry ether was added 37.3 grams of dioctylphosphorosulfenyl chloride over a thirty minute period at 20° C. The reaction mixture was stirred for an additional hour at room temperature, the ether evaporated, and the product concentrated to 50° C. at a pressure of 1.0 mm. of Hg. The product weighing 42.7 grams (94.5% of theoretical yield), and analyzing as 6.7% P and 13.3% S, as compared to 6.8% P and 14.1% S theoretical, was identified as $$(C_8H_{17}O)_2P(O)SSC(O)NHC_3H_5$$

EXAMPLE 5

To a solution of 14.5 grams of N-(allyl)-O-(ethyl) thiocarbamate in 200 cc. of ether was added 28.9 grams of O-(ethyl)-O-(octyl) phosphorosulfenyl chloride over a thirty minute period at 20° C. The reaction mixture was stirred at room temperature for an additional hour, the ether evaporated, and the product concentrated to 50° C. at a pressure of 1.0 mm. of Hg to yield 35.1 grams (95.0% yield) of $$(C_2H_5O)_2(C_8H_{17}O)P(O)SSC(O)NHC_3H_5$$

EXAMPLE 6

To a solution of 21.6 grams of N-(allyl)-O-(ethyl) thiocarbamate in 200 cc. of ether was added 38.8 grams of diethylphosphorosulfenyl chloride over a thirty minute period at 20° C. The product was stirred for one additional hour at room temperature, the ether evaporated, and the product concentrated by evacuating to 1.0 mm.

Hg at 50° C. The product weighed 43.0 grams (98% of theoretical yield), had an index of refraction $$N_D^{25}=1.5089$$

and analyzed 10.5% P and 21.6% S, compared to 10.8% P and 22.4% S, theoretical, for $$(C_2H_5O)_2P(O)SSC(O)NHC_3H_5$$

The compounds characterized by the foregoing examples have been found to have valuable pesticidal properties. In particular, these compounds are valuable in the control of common insect pests such as beetles, roaches, flies, etc. By the term "insect" the utility of the compounds of the invention is not intended to be limited to the narrow technical definition of this term, i.e., segmented six-legged pests, but rather it is intended that the compounds are also useful against other common pests such as spiders, mites, ticks, caterpillars, nematodes, and the like.

In the following described tests, demonstrating the utility of the novel compounds, four insect species representing four common orders were used. These species were:

American cockroach—*Periplaneta americana*—
  Orthoptera
Confused flour beetle—*Tribolium confusum*—
  Coleoptera
House fly—*Musca domestica*—Diptera
Spotted milkweed bug—*Oncopeltus fasciatus*—
  Heteroptera In screening the compounds of the foregoing examples on the above insect species, adult houseflies or nymphs of the American and German cockroach, or spotted milkweed bugs are caged in cardboard mailing tubes with cellophane bottoms and coarse, mesh nylon tops, and supplied with food and water. From ten to twenty-five insects are employed per cage depending on the species. Candidate pesticides are dissolved in 10 ml. of a suitable solvent, usually acetone. Aliquots of the toxicant solution are suspended in water containing 0.0175% by volume of Sponto 221, an emulsifying agent, and sprayed on the caged insects. All compounds are sprayed initially at 0.1% by spraying with a De Vilbiss hand sprayer at 20 p.s.i. in a fume hood. Final mortality readings are taken after seventy-two hours.

The saltmarsh caterpillar, *Estigmene acrea*, is screened in the following manner: Dock leaves approximately five inches long are dipped in aqueous suspensions of the test materials for ten seconds. The leaves are then placed in one pint food containers with the petioles projecting through small holes in the bottoms into vials containing tap water. Five third instar (eight to ten days old) salt marsh larvae are introduced and the container closed with a petri dish lid. Mortality readings are taken at twenty-four and forty-eight hours.

In the bioassay test for the confused flour beetles, *Tribolium confusum*, cages such as those described above for the screening tests are used. Acetone solutions of the candidate materials are prepared and measured aliquots are placed in petri dishes having a surface area of 18.8 sq. cm. One milliliter of a suspension of peanut oil in acetone is added as a filming agent. The solvent is evaporated by air-drying and groups of twenty adult beetles are exposed to the residue in the petri dishes which are placed in the cages. The mortality is checked at twenty-four and forty-eight hours.

The aforesaid insect species were tested in accordance with these procedures using the compound of Example 6 as the toxicant. The mortalities obtained with the given insect species are summarized in the following table:

TABLE

| | Mortality, percent |
|---|---|
| Housefly (screen)—0.001% spray | 100 |
| American cockroach (screen)—0.01% spray | 60 |
| Spotted milkweed bug (screen)—0.1% spray | 70 |
| Confused flour beetle (bioassay)—10μg. residue | 70 |
| Salt marsh caterpillar (screen)—0.1% spray | 40 |

The insecticidal compounds are normally applied in the form of aqueous dispersions, although the same compounds may also be used commercially in the form of aqueous solutions (when appreciably soluble), non-aqueous solutions, wettable powders, vapors, and dusts, as best suited to the contemplated use. In some applications, filters will be incorporated with the toxic compounds. For more specialized applications, the toxicant may even be used in its pure, undiluted form.

The foregoing description is given for clearness of understanding only, and no unnecessary limitations should be understood therefrom, as modifications will be obvious to those skilled in the art.

We claim:

A process for preparing a compound of the general formula:

$$\begin{array}{c} RO \\ \diagdown \\ R_1O \end{array} \!\!\! \begin{array}{c} O \\ \| \\ P \end{array} \!\!\!-\!S\!-\!S\!-\! \begin{array}{c} O \\ \| \\ C \end{array} \!-\!N \!\!\! \begin{array}{c} \diagup R^2 \\ \diagdown R^3 \end{array}$$

wherein R and R¹ are lower alkyl, R² is a member selected from the group consisting of allyl and methallyl, and R³ is selected from the group consisting of hydrogen, allyl, and methallyl, which comprises reacting a compound of the formula:

$$\begin{array}{c} RO \\ \diagdown \\ R_1O \end{array} \!\!\! \begin{array}{c} O \\ \| \\ P \end{array} \!\!\!-\!SCl$$

wherein R and R¹ are as defined hereinabove, with a compound of the formula:

$$R^4O\!-\! \begin{array}{c} S \\ \| \\ C \end{array} \!-\!N \!\!\! \begin{array}{c} \diagup R^2 \\ \diagdown R^3 \end{array}$$

wherein R² and R³ are as defined hereinabove and R⁴ is an alkyl radical, while maintaining the reaction temperature between about 0° C. and 70° C.

References Cited by the Examiner

UNITED STATES PATENTS

| 2,494,283 | 1/1950 | Cassaday et al. | 260—943 X |
| 2,582,204 | 1/1952 | Kosolapoff | 167—22 |
| 2,648,696 | 8/1953 | Whetstone | 260—461 |
| 2,786,009 | 3/1957 | Pianfetti et al. | 167—22 |
| 3,018,215 | 1/1962 | Pianka | 260—934 X |
| 3,094,548 | 6/1963 | Price et al. | 260—461 |

CHARLES B. PARKER, *Primary Examiner.*

JOSEPH P. BRUST, FRANK M. SIKORA,
*Assistant Examiners.*